March 24, 1953 C. B. SMITH 2,632,327
MASS FLOW MEASURING DEVICE
Filed Aug. 17, 1950

INVENTOR
C. BRANSON SMITH

BY Leonard F. Wehlind
AGENT

Patented Mar. 24, 1953

2,632,327

UNITED STATES PATENT OFFICE 2,632,327

MASS FLOW MEASURING DEVICE

Charles Branson Smith, Portland, Conn., assignor to United Aircraft Corporation, East Hartford, Conn., a corporation of Delaware Application August 17, 1950, Serial No. 180,040

10 Claims. (Cl. 73—194)

This invention relates to mass flow measuring devices and more particularly to accurate measuring devices of this type.

It is the almost universal practice to measure mass flow (velocity times density) by measuring the product of some function of density and velocity squared and correcting for temperature and other ambient conditions. The correcting devices may be mechanical or the corrections may be computed from temperature readings, etc. The most desirable instrument is one which would measure the product of density and velocity (mass flow) rather than measuring some function of density times velocity squared (energy).

It is therefore an object of this invention to provide a mass flow measuring device which directly measures density times velocity regardless of variations of temperature, velocity, etc.

Another object of this invention is to provide a measuring device of the type described by comparing the static pressure of a stream to the static pressure over an airfoil of known characteristics and which is moved at a known velocity transversely of the fluid stream.

A further object of this invention is to provide a simple yet extremely accurate mass flow measuring device whose accuracy is undiminished by variations in temperature or velocity of the fluid stream.

Figure 1:
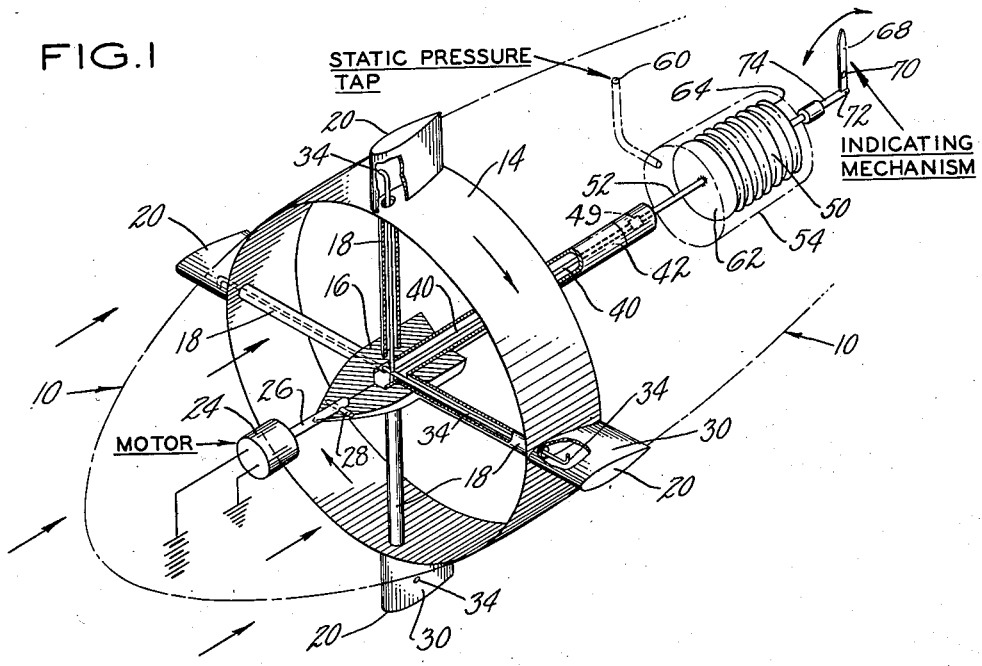
Figure 2:
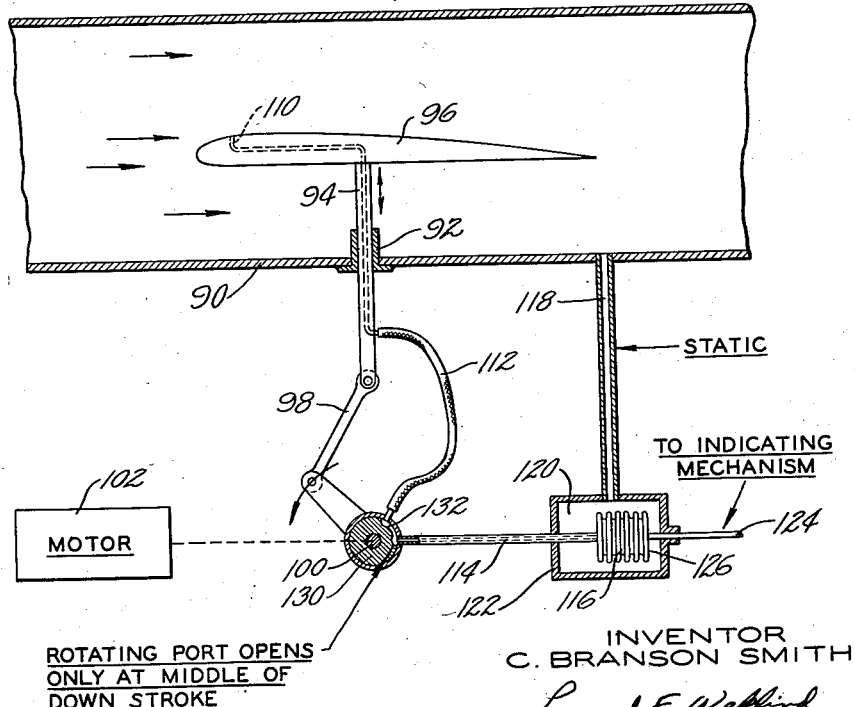

These and other objects will become readily apparent from the following detailed description of the accompanying drawings in which:

Fig. 1 is a three-quarter partially schematic view of the mass flow measuring apparatus according to this invention; and Fig. 2 is a modified form of mass flow measuring apparatus.

Referring to Fig. 1, a streamline body 10 is shown which may form the fuselage of a missile for example, or the inner body for an annular inlet for a turbine or ramjet power plant. An annular ring 14 may form part of the outer surface of the streamline body 10 and be mounted for rotation relative thereto by any suitable well-known means. The annular ring 14 is fixed to a central hub 16 by a plurality of hollow spokes 18. A plurality of airfoils 20 are fixed to the outer surface of the ring 14 with their spanwise plane substantially normal to the adjacent surface of the ring 14 and with their chordwise dimension substantially parallel to the longitudinal axis of the body 10 and to the axis of the fluid stream. An electoral motor 24 or other suitable power means is fixed to the hub 16 by means of a shaft 26 and a lock pin 28 for rotating the hub 16 at some predetermined speed. During rotation of the hub 16 the annular ring 14 and the airfoils 20 will be rotated about the axis of fluid flow. As the airfoils 20 are moved in this manner transversely of the axis of flow they will have an effective angle of attack relative to the stream so that a low pressure area will be created over the surface 30 of each of the airfoils 20. The value of the pressure in this low pressure area as compared with the static pressure of the stream adjacent the surface of the main body 10 will be a function of the mass flow of the fluid stream in a manner which will be explained hereinafter.

In order to measure the pressure in this low pressure area a plurality of static pressure taps 34 lead from each of the surfaces 30 of the airfoils 20 to a common conduit 40. The conduit 40 is fixed for rotation with a hollow shaft 42 which rotates with the hub 16 and the annular ring 14. By means of a slip joint 49 the pressure in the conduit 40 is lead internally of a bellows 50 by means of a fixed line 52. The bellows 50 is contained in a hollow sealed casing 54 into which is admitted the pressure obtained from the static pressure tap 60 adjacent the outer surface of the main body 10. The wall 62 of the bellows will normally be fixed relative to the casing 54 while the wall 64 of the bellows will be axially movable relative to the casing 54. It will then be apparent that a pointer 68 may be pivoted at 70 intermediate its ends while being connected at 72 to a rod 74 which will reciprocate with the movable wall 64 of the bellows 50. The pointer 68 will then indicate the difference of the average static pressure on the low pressure side of the airfoils 20 and the static pressure adjacent the surface of the body 10.

By selecting the location of the pivot point 70 and by selecting the relative size of the bellows 50, mechanical correction can be inserted in the system so that the pointer 68 will indicate a measurement of mass flow of the fluid stream. The selection of the pivot point 70 and the bellows 50 is made but once so that they produce a mechanical correction commensurate with the constant K mentioned below. A mathematical illustration as to why the above described mechanism will directly indicate mass flow regardless of variations in temperature and velocities is shown below.

From the general equation for lift, an expression for obtaining a measurement of V may be determined as follows:

where:

$L$ = lift per unit span $C_L$ = lift coefficient $\dfrac{dC_L}{d\alpha}$ = lift curve slope $\alpha$ = effective angle of attack $V$ = free stream velocity $q = \tfrac{1}{2}\rho v^2$ $w$ = transverse velocity $\rho$ = density $c$ = airfoil chord $\Delta P$ = static pressure difference between free stream and point on airfoil $C_P$ = pressure coefficient $$C_P = \frac{\Delta P}{q}$$

$$L = C_L \tfrac{1}{2}\rho V^2 c$$

$$L = \frac{dC_L}{d\alpha}(\alpha)\tfrac{1}{2}\rho V^2 c$$

$$L = \frac{dC_L}{d\alpha}\frac{w}{V}\tfrac{1}{2}\rho V^2 c$$

$$\rho V = \frac{2L}{\dfrac{dC_L}{d\alpha}wc}$$

since $$L = C_L q c$$

$$\Delta P = C_P q$$

$$L = \frac{C_L}{C_P}\Delta P c$$

then $$\rho V = \frac{2\dfrac{C_L}{C_P}\Delta P}{\dfrac{dC_L}{d\alpha}w}$$

For any particular airfoil and transverse velocity, all quantities in the equation are known and constant except $\Delta P$, so that the equation reduces to $\rho V = K\Delta P$.

It is thus apparent that the above referred to mechanical correction can be made in the system to take care of the constant $K$ so that the indicator will show the difference in pressures or $\rho V$, the mass flow.

Fig. 2 illustrates a modified form of this invention which operates substantially on the same principle described above. In this figure, a confining wall 90 is shown having a bushing 92 passing therethrough into the airstream. A hollow tube 94 is slideably mounted in the bushing 92 and carries at its upper end an airfoil 96 having its chordwise dimension substantially in streamlined relation with the oncoming stream. The lower end of the tube 94 is connected to a crank arm 98 fixed to a drive shaft 100 which is operatively connected to a motor 102 whereby the hollow tube 94 and the airfoil 96 will be reciprocated transversely of the airstream at a predetermined frequency. In a manner similar to that illustrated in Fig. 1, a pressure tap 110 measures the static pressure on the upper surface of the airfoil 96 and directs this pressure by a line 112 and the line 114 internally of the bellows 160. Line 118 measures the static pressure over the confining surface 90 and directs this pressure to the chamber 120 of the casing 122 so that this latter static pressure surrounds the bellows 116. It will be apparent then that the rod 124, which is fixed to the movable wall 126 of the bellows, can be attached to the indicating mechanism similar to that shown in Fig. 1 for indicating the difference in the static pressure adjacent the upper surface of the airfoil 96 and the static pressure adjacent the confining surface 90.

Inasmuch as the airfoil 96 is varying in velocity during its reciprocating movement, and since the static pressure measurement on the upper surface of the airfoil 96 is desired to be taken when the airfoil is at a positive effective angle of attack relative to the airstream, it is necessary to measure the static pressure when the airfoil is at some predetermined point in its movement in a downward direction. To this end, a rotating valve 130 is fixed for rotation with the shaft 100 so that the valve port 132 permits communication between the flexible line 112 and the line 114 when the airfoil 96 is approximately at the middle of its downward stroke.

It is therefore apparent that as a result of this invention a simple yet accurate apparatus has been provided for measuring directly the mass flow of a fluid stream regardless of variations of temperature and velocity of the fluid stream.

Further as a result of this invention a simple apparatus has been provided which can readily be adapted for use in any type of combustion power plants in conduits or any other instances where it is desired to measure mass flow. A further advantage is achieved where it is desired to control various mechanisms in response to mass flow since the many corrective appliances such as those for temperature can be eliminated.

Although only certain embodiments of this invention have been illustrated and described herein, it will be evident that various changes and modifications may be made in the construction and arrangement of the various parts without departing from the scope of this novel concept.

What it is desired to obtain by Letters Patent is:

1. In a mass flow measuring device for a fluid stream, an airfoil having its chordwise dimension set parallel to the axis of flow, means for moving said airfoil at a predetermined velocity transversely of the axis of flow to give said airfoil an effective angle of attack relative to the stream, and means for measuring the difference in the static pressure of the free stream and the static pressure over the low pressure surface of said airfoil.

2. In a mass flow measuring device for a fluid stream, an airfoil positioned in said stream in streamlined relation therewith, means for moving said airfoil at a predetermined velocity transversely of said stream whereby said airfoil has an effective angle of attack relative to said stream and creating high and low pressure sides of said airfoil, means for sensing the static pressure of said stream, means for sensing the static pressure over the low pressure side of said surface, and means communicating with both of said pressure sensing means for measuring the differential of said pressures to indicate the mass flow of said stream.

3. A measuring device according to claim 2 wherein said airfoil is bodily rotated about the axis of flow of the stream.

4. A measuring device according to claim 2 wherein said airfoil is bodily moved in reciprocating motion transversely of the axis of flow of the stream.

5. In a mass flow measuring device for a flowing fluid stream, an airfoil of predetermined aerodynamic characteristics positioned in said stream with its chordwise dimension parallel to the axis of flow, means for moving said airfoil at a predetermined velocity transversely of the axis of flow whereby said airfoil has an effective angle of attack relative to the flowing fluid, means for sensing the static pressure of said flowing fluid, means for sensing the static pressure at a point on the low pressure surface of said airfoil, and means responsive to fluid under pressure for measuring the difference of said pressures including an expansible and contractible fluid chamber communicating with both of said pressure sensing means.

6. In a mass flow measuring device for an airstream, an airfoil of predetermined aerodynamic characteristics exposed to said stream in substantially streamlined relation therewith, means for moving said airfoil at a predetermined velocity transversely of the axis of flow of said stream whereby said airfoil has an effective angle of attack relative to said stream, means for sensing the static pressure of said stream, means for sensing the static pressure over the low pressure surface of said airfoil, and means communicating with both of said pressure sensing means for measuring the differential of said pressures to indicate the mass flow of said stream including mechanism having a mechanical correction for the constant in the equation:

where:
$$\rho V = K \Delta P$$
$$K = \frac{2\frac{C_L}{C_P}}{\frac{dC_L}{d\alpha}w}$$

and where:

$V$ = free stream velocity
$\rho$ = density
$\Delta P$ = static pressure difference between free stream and point of measurement on airfoil.
$C_L$ = lift coefficient of airfoil
$\alpha$ = effective angle of attack
$w$ = transverse velocity of airfoil
$C_P$ = pressure coefficient 7. In a mass flow measuring device for a flowing airstream, at least one airfoil having its span running transversely of the axis of flow and in substantial streamline relation therewith, means for bodily rotating said airfoil about the axis of flow at a predetermined velocity to provide high and low pressure sides on said airfoil, said airfoil having predetermined aerodynamic characteristics, means for sensing the static pressure of said free stream including a first conduit, means for sensing the static pressure adjacent the low pressure side of said airfoil including a second conduit, a closed chamber communicating with said first conduit, a variable chamber within said closed chamber communicating with said second conduit and including a movable wall portion thereof, and means operatively connected to said movable wall portion responsive to the difference of said pressures including mechanism for indicating the mass of said flowing stream.

8. A mass flow measuring device according to claim 7 wherein said indicating mechanism includes a mechanical correction for a constant consisting of the predetermined aerodynamic characteristic of the airfoil and the predetermined velocity of said airfoil.

9. In a mass flow measuring device for a fluid stream, an airfoil in said stream in substantial streamlined relation therewith, said airfoil having predetermined characteristics, means for bodily reciprocating said airfoil transversely of the axis of flow of said stream at a predetermined frequency thereby producing high and low pressure sides on said airfoil, means for sensing the static pressure of said stream, means for sensing the static pressure over the low pressure side of said airfoil at a predetermined instant of its reciprocating movement, and means communicating with both of said pressure sensing means for measuring the difference of said pressures to indicate the mass flow of said stream.

10. In a mass flow measuring device for a fluid stream, an airfoil located in said stream in substantial streamlined relation therewith, said airfoil having predetermined aerodynamic characteristics, means for reciprocably moving said airfoil bodily transversely of the axis of flow of the stream at a predetermined frequency, means for sensing the static pressure of the stream, means for sensing the static pressure at a point on said airfoil, bellows mechanism having connections to said pressure sensing means for detecting the difference in said pressures, the connection to said sensing means for the airfoil including port means operable in timed relation to the movements of said airfoil whereby the sensed static pressures on said airfoil are communicated with said bellows mechanism at a predetermined position of said airfoil, and means operatively connected to said bellows mechanism for indicating the mass flow of said stream including mechanical correction means for a constant comprising the predetermined aerodynamic characteristics of said airfoil and the velocity of motion of said airfoil.

C. BRANSON SMITH.

REFERENCES CITED

The following references are of record in the file of this patent:

UNITED STATES PATENTS

| Number | Name | Date |
| --- | --- | --- |
| 1,405,177 | Zahm | Jan. 31, 1922 |